(12) United States Patent  (10) Patent No.: US 8,263,272 B2
Yoshikata et al.  (45) Date of Patent: Sep. 11, 2012

(54) COGENERATION SYSTEM USING FUEL CELL

(75) Inventors: Kuniaki Yoshikata, Shinjuku-ku (JP); Hirotoshi Sakamoto, Shinjuku-ku (JP)

(73) Assignee: Dai Nippon Printing Co., Ltd., Shinjuku-ku Tokyo (JP)

( * ) Notice: Subject to any disclaimer, the term of this patent is extended or adjusted under 35 U.S.C. 154(b) by 1347 days.

(21) Appl. No.: 11/667,273

(22) PCT Filed: Nov. 9, 2005

(86) PCT No.: PCT/JP2005/020560
§ 371 (c)(1), (2), (4) Date: Jul. 27, 2007

(87) PCT Pub. No.: WO2006/051830
PCT Pub. Date: May 18, 2006

(65) Prior Publication Data
US 2008/0118795 A1  May 22, 2008

(30) Foreign Application Priority Data

Nov. 9, 2004 (JP) ................................. 2004-324609
Nov. 9, 2004 (JP) ................................. 2004-324612
Nov. 9, 2004 (JP) ................................. 2004-325499
Nov. 9, 2004 (JP) ................................. 2004-325502

(51) Int. Cl.
*H01M 8/04* (2006.01)
(52) U.S. Cl. .......................... 429/423; 429/441; 320/101
(58) Field of Classification Search .................. 429/423, 429/441, 444, 492, 495, 513; 320/101
See application file for complete search history.

(56) References Cited

U.S. PATENT DOCUMENTS

| 6,309,770 B1 * | 10/2001 | Nagayasu et al. ............ 429/415 |
| 7,736,774 B2 | 6/2010 | Ogiwara et al. |
| 2003/0134174 A1 | 7/2003 | Akikusa et al. |
| 2004/0177607 A1 | 9/2004 | Suzuki et al. |
| 2005/0089731 A1 | 4/2005 | Ogiwara et al. |
| 2009/0130522 A1 | 5/2009 | Akikusa et al. |

FOREIGN PATENT DOCUMENTS

| JP | 63-205058 A1 | 8/1988 |
| JP | 06-196176 A | 7/1994 |
| JP | 09-266008 A | 10/1997 |
| JP | 11-162492 A | 6/1999 |
| JP | 2002-151127 A | 5/2002 |
| JP | 2002-168439 A | 6/2002 |
| JP | 2002-260697 A | 9/2002 |
| JP | 2003-051319 A | 2/2003 |

(Continued)

*Primary Examiner* — Jennifer Michener
*Assistant Examiner* — Monique Wills
(74) *Attorney, Agent, or Firm* — Fitch, Even, Tabin & Flannery, LLP

(57) ABSTRACT

A cogeneration system using a fuel cell includes a gas-mixture-supply passage L supplied with a fuel gas and an oxidant gas; a gas combustor 31 for combusting the gas mixture which has passed through the gas-mixture-supply passage L; a combustion chamber 3 for housing the gas combustor 31; and a power generator 2 disposed on the gas-mixture-supply passage L and having at least one fuel cell that generates power from the gas mixture flowing through the supply passage L. The power generator 2 is located in the combustion chamber 3, so as to be heated by the heat of combustion produced in the combustion chamber 3.

45 Claims, 10 Drawing Sheets

FOREIGN PATENT DOCUMENTS

| | | |
|---|---|---|
| JP | 2003-223912 A | 8/2003 |
| JP | 2003-229164 A1 | 8/2003 |
| JP | 2003-257442 A | 9/2003 |
| JP | 2004-111392 A | 4/2004 |
| JP | 2004-234969 A | 8/2004 |
| JP | 2004-273354 A | 9/2004 |
| JP | 2005-243470 A | 9/2005 |

* cited by examiner

COGENERATION SYSTEM USING FUEL CELL

This Application is the U.S. National Stage filing under 35 U.S.C. 371 of International Application No. PCT/JP2005/020560 filed Nov. 9, 2005, which designated the U.S. and was not published under PCT Article 21(2) in English, and this application also claims, via the aforesaid International Application, the foreign priority from Japanese Application No. 2004-324609, filed Nov. 9, 2004, Japanese Application No. 2004-324612, filed Nov. 9, 2004, Japanese Application No. 2004-325499, filed Nov. 9, 2004, and Japanese Application No. 2004-325502, filed Nov. 9, 2004, and the complete disclosure of each of the aforesaid prior applications is incorporated herein by reference.

TECHNICAL FIELD

The present invention relates to a cogeneration system using a fuel cell that generates power from a fuel gas and an oxidant gas.

BACKGROUND ART

A cogeneration system is a system that produces, from primary energy, two or more forms of secondary energy continuously and simultaneously. Among such cogeneration systems, systems using a fuel cell that provide high power-generating efficiency and do not emit environmentally harmful gases have recently attracted attention, and the development of such systems is in progress.

As one of this type of cogeneration systems using a fuel cell, Japanese Unexamined Patent Application Publication No. 2002-168439, for example, proposes a system in which the exhaust gas from a fuel cell is burned by a burner, and the heat produced from the burner is used to heat a power generator.

Conventional cogeneration systems using a fuel cell, however, have not provided sufficient power-generating efficiency, and therefore further improvements have been desired.

The present invention has been accomplished to solve this problem; hence an object of the invention is to provide a cogeneration system using a fuel cell which offers increased power-generating efficiency.

DISCLOSURE OF THE INVENTION

First Aspect of the Invention

In accordance with a first aspect of the invention, a cogeneration system using a fuel cell includes a gas-mixture-supply passage supplied with a gas mixture of a fuel gas and an oxidant gas; a gas combustor for combusting the gas mixture which has passed through the gas-mixture-supply passage; a combustion chamber for housing the gas combustor; and a power generator disposed on the gas-mixture-supply passage and having at least one fuel cell that generates power from the gas mixture flowing through the gas-mixture-supply passage; wherein the power generator is located in the combustion chamber, so as to be heated by the heat of combustion produced in the combustion chamber.

The power generator may be heated by the heat of combustion produced in the combustion chamber to ensure a sufficient operating temperature of the power generator.

The fuel cell may be a single-chamber solid oxide fuel cell that has an electrolyte, a fuel electrode and an air electrode, and generates power when supplied with the gas mixture of the fuel gas and oxidant gas.

The system may further include a gas mixer for mixing the fuel gas and oxidant gas.

The gas mixer may be located in the combustion chamber to preheat the gas mixture.

At least one of a supply passage for supplying the fuel gas to the power generator and a supply passage for supplying the oxidant gas to the power generator may be provided in the combustion chamber to preheat the gas or gases.

The system may further include a heat exchanger located in the combustion chamber. The fuel gas and oxidant gas may be preheated by the heat of combustion produced in the combustion chamber via the heat exchanger, and supplied to the power generator.

The system may further include a storage battery for storing the power generated by the fuel cell.

The system may further include a system controller for controlling each of the components.

The system controller may control the supply of the gas mixture to the gas combustor so that an optimum combustion condition is maintained in consideration of the amount of gas mixture consumed by the fuel cell.

The power generator may have a plurality of fuel cells, each of which is supplied with the gas mixture that passes through the gas-mixture-supply passage.

According to the above-described first aspect of the invention, the gas mixture of the fuel gas and oxidant gas is supplied through the gas-mixture-supply passage to the gas combustor, where gas combustion takes place. The power generator with a fuel cell is disposed on the gas-mixture-supply passage, and generates power using the gas mixture supplied to the gas combustor. This allows power generation simultaneous with the generation of heat from the gas combustor, thus resulting in efficient use of energy. Note that the power generated can be used as a power source for operating this system, or for controlling the temperature of the heat discharged from the gas combustor. Moreover, the power generator is located in the combustion chamber and directly heated by the heat of combustion produced in the combustion chamber. Hence, the power generator can be directly heated by the heat of combustion in the combustion chamber, so as to enhance the efficiency of heating the power generator. As a result, the efficiency of generating power can be improved.

The gas-supply passage can be simplified by using a single-chamber solid oxide fuel cell as the fuel cell of the power generator.

A gas mixer may further be provided to allow the gas mixture to be supplied more stably to the combustor or the power generator.

At least one of the fuel gas and oxidant gas is preheated by the heat of combustion produced in the combustion chamber, which minimizes any reduction in the temperature of the power generator caused by the gas supply. This saves electric power for use in heating the power generator.

Moreover, a storage battery for storing the power generated by the fuel cell may further be provided to allow excess power generated by the power generator to be stored therein.

A system controller may further be provided for adjusting, for example, the gas supplies to the gas combustor and the combustion chamber, so as to allow power generation and combustion to take place appropriately, while reducing the amounts of fuel and oxidant gases. Particularly, the fuel cell consumes the gas mixture, and therefore the supply of the gas mixture to the gas combustor may be controlled in consideration of this consumption, so as to maintain the gas combustion under optimum conditions. The power generation may be configured in a variety of ways. For example, a plurality of fuel cells may be disposed so that the gas mixture in the gas-mixture-supply passage is supplied to each of the fuel cells. Accordingly, a plurality of fuel cells may be connected in parallel when used.

Second Aspect of the Invention

According to a second aspect of the invention, a cogeneration system using a fuel cell includes a gas-supply passage that separately supplies a fuel gas and an oxidant gas; a gas mixer for mixing the fuel gas and oxidant gas which have passed through the gas-supply passage; a combustion chamber for housing a gas combustor to combusts the gas mixture mixed by the gas mixer; and a power generator disposed on the gas-supply passage and having a fuel cell that generates power when supplied with the fuel gas and oxidant gas separately; wherein the power generator is located in the combustion chamber, so as to be heated by the heat of combustion produced in the combustion chamber.

The power generator may be heated by the heat of combustion produced in the combustion chamber to ensure a sufficient operating temperature of the power generator.

The fuel cell may have an electrolyte, a fuel electrode and an air electrode, the fuel electrode being formed on one surface of the electrolyte and the air electrode being formed on the other surface of the electrolyte, wherein the fuel cell generates power when the fuel gas is supplied to the fuel electrode and the oxidant gas is supplied to the air electrode.

The fuel cell may also be a solid polymer fuel cell or a solid oxide fuel cell.

The system may further include a detector for detecting a mixture ratio of the gas mixture; and a gas-mixture-ratio adjuster for adjusting the mixture ratio to a set value based on a detection signal from the detector.

The gas-supply passage may have a fuel-gas-supply passage for supplying a fuel gas and an oxidant gas-supply passage for supplying an oxidant gas, and at least one of these supply passages may be located in the combustion chamber to preheat the gas or gases.

The system may further comprise a heat exchanger located in the combustion chamber. Through this heat exchanger, the fuel gas and oxidant gas may be preheated by the heat of combustion produced in the combustion chamber, and supplied to the power generator.

The system may further include a storage battery for storing the power generated by the fuel cell.

The system may further include a system controller for controlling each of the components.

The system controller may control the supply of the fuel gas and oxidant gas to the gas mixer so that an optimum combustion condition is maintained based on the amounts of the gases consumed by the fuel cell.

The power generator may have a plurality of fuel cells, each of which is supplied with the fuel gas and oxidant gas that pass through the gas supply passage.

According to the above-described second aspect of the invention, the gas-supply passage supplies the fuel gas and oxidant gas separately to the gas mixer. The gas mixture mixed by the gas mixer is then supplied to the combustor, where the gas is combusted. In the invention, the power generator with a fuel cell is disposed on the gas-supply passage, and generates power using the fuel gas and oxidant gas supplied to the gas mixer. This allows power generation simultaneous with the generation of heat from the gas combustor, thus resulting in efficient use of energy. Note that the power generated can be used as a power source for operating this system, or for controlling the temperature of the heat discharged from the gas combustor. Moreover, in the invention, the power generator is located in the combustion chamber and directly heated by the heat of combustion produced in the combustion chamber, i.e., heat from the gas combustor. Hence, the power generator can be directly heated by the heat of combustion in the combustion chamber, so as to enhance the efficiency of heating the power generator. As a result, the efficiency of generating power can be improved.

A gas mixer may further be provided to allow the gas mixture to be supplied more stably to the combustor.

A detector for detecting a mixture ratio of the gas mixture, and a gas-mixture-ratio adjuster for adjusting the mixture ratio to a set value based on a detection signal from the detector may further be provided to ensure stable combustion in the gas combustor.

Furthermore, at least one of the fuel gas and oxidant gas supplied to the power generator is preheated by the heat of combustion produced in the combustion chamber, which minimizes any reduction in the temperature of the power generator caused by the gas supply. This saves the electric power for use in heating the power generator.

A storage battery for storing the power generated by the fuel cell may further be provided to allow excess power generated by the power generator to be stored therein.

A system controller may further be provided for adjusting, for example, the gas supplies to the gas combustor and the combustion chamber, so as to allow power generation and combustion to take place appropriately, while reducing the amounts of fuel and oxidant gases. Particularly, the fuel cell consumes the fuel gas and oxidant gas, and therefore the supply of these gases to the gas mixer may be controlled based on the consumption of each gas, thereby controlling the supply of the gases to the combustor. The gas combustion can thus be maintained under optimum conditions. The power generation may be configured in a variety of ways. For example, a plurality of fuel cells may be disposed so that the fuel gas and oxidant gas in the gas-supply passage are supplied to the fuel electrode and the air electrode, respectively, of each of the fuel cells. Accordingly, a plurality of fuel cells may be connected in parallel when used.

Third Aspect of the Invention

According to a third aspect of the invention, a cogeneration system using a fuel cell includes a power generator having a fuel cell that generates power when supplied with a fuel gas and an oxidant gas, and a combustion chamber having a gas combustor for combusting exhaust gases from the power generator, wherein at least one of the fuel gas and oxidant gas is preheated by part of the heat of combustion produced in the gas combustor.

The fuel cell may be a solid oxide fuel cell or a solid polymer fuel cell having an electrolyte, a fuel electrode and an air electrode, the fuel electrode being formed on one surface of the electrolyte and the air electrode being formed on the other surface of the electrolyte, wherein the fuel cell generates power when the fuel gas is supplied to the fuel electrode and the oxidant gas is supplied to the air electrode.

The fuel cell may also be a single-chamber solid oxide fuel cell that has an electrolyte, a fuel electrode and an air electrode, and generates power when supplied with a gas mixture of the fuel gas and oxidant gas.

The system may further include a gas mixer for mixing the exhaust gases discharged from the power generator and supplied to the gas combustor. The cogeneration system using a fuel cell according to claim 22.

The system may further include a gas mixer for mixing the fuel gas and oxidant gas supplied to the power generator.

The system may further include a system controller for controlling at least either the flow rates and pressures of the fuel gas and oxidant gas supplied to the power generator, or the temperatures of the power generator and the combustion chamber.

The system may further include a system controller for controlling the gas-mixture ratio in the gas mixer.

At least either a fuel-gas-supply passage or an oxidant gas-supply passage for supplying the fuel gas or oxidant gas, respectively, to the power generator, may pass through the combustion chamber, whereby at least either the fuel gas or oxidant gas is preheated by part of the heat of combustion generated from the gas combustor.

The system may further include a heat exchanger. Through this heat exchanger, at least either the fuel gas or oxidant gas may be preheated by part of the heat of combustion produced in the gas combustor.

The system may further include a storage battery for storing the power generated by the fuel cell.

According to the above-described third aspect of the invention, the exhaust gases from the power generator are recycled for use by the gas combustor. This enhances the fuel utilization efficiency. As a result, the efficiency of generating power can be increased. Moreover, the heat of combustion generated from the gas combustor can be used to preheat the fuel gas and the like, so as to maintain the operating temperature of the fuel cell at a high temperature.

In addition, the gas-supply passage and the gas-exhaust passage can be simplified by using a single-chamber solid oxide fuel cell as the fuel cell of the power generator.

A gas mixer may further be provided to allow the gas mixture to be supplied more stably to the combustor, and the heat exchanger may further be provided to preheat the fuel gas and/or the oxidant gas more stably.

A system controller may further be provided to control any of the flow rates and pressures of the fuel gas and oxidant gas supplied to the power generator, the temperatures of the power generator and the combustion chamber, and the gas-mixture ratio in the gas mixer, so as to reduce the amounts of the fuel and oxidant gases, and to adjust the gas mixture in the gas mixer to the optimum set gas-mixture ratio. A storage battery may further be provided to allow excess power generated by the power generator to be stored therein.

Fourth Aspect of the Invention

According to a fourth aspect of the invention, a cogeneration system using a fuel cell includes a combustion chamber having a gas combustor in which combustion takes place when supplied with an inflammable fuel and an oxidant gas, and a power generator having a fuel cell that generates power when supplied with a combustion product containing a hydrocarbon gas discharged from the gas combustor by combustion.

The system may further include a system controller for detecting at least either the amount or the composition of the combustion product discharged, and controlling the flow rates of the inflammable fuel and oxidant gas supplied to the gas combustor based on a detection result.

The system may further have an oxidizer-supply means for supplying an oxidant gas to the combustion product before the combustion product is supplied to the power generator.

The system controller may detect at least either the amount or the composition of the combustion product, and control the supply of the oxidant gas from the oxidizer-supply means based on a detection result.

The fuel cell may be a single-chamber solid oxide fuel cell that has an electrolyte, a fuel electrode and an air electrode, and generates power when supplied with the gas mixture of the oxidant gas and the combustion product discharged from the gas combustor.

The fuel cell may be a solid oxide fuel cell having an electrolyte, a fuel electrode and an air electrode, the fuel electrode being formed on one surface of the electrolyte and the air electrode being formed on the other surface of the electrolyte, wherein the fuel cell generates power when the combustion product discharged from the gas combustor is supplied to the fuel electrode and the oxidant gas is supplied to the air electrode.

The fuel cell may be a solid oxide fuel cell having an electrolyte, a fuel electrode and an air electrode, the fuel electrode being formed on one surface of the electrolyte and the air electrode being formed on the other surface of the electrolyte, wherein the fuel cell generates power when the combustion product discharged from the gas combustor is supplied to the fuel electrode and the oxidant gas is supplied to the air electrode; the system further including a humidifier for humidifying the combustion product discharged from the gas combustor.

The system may further include a humidifier for humidifying the combustion product discharged from the gas combustor.

The power generator may be located in the combustion chamber, so as to be heated by the heat of combustion produced in the combustion chamber.

The system may further include a reformer for reforming the combustion product discharged from the gas combustor.

The system may further include a bypass line for drawing part of the gas mixture of the inflammable fuel and the oxidant gas supplied to the gas combustor, and supplying the gas mixture directly to the power generator.

The gas mixture discharged from the power generator may be circularly supplied to the gas combustor.

The system controller may control the temperatures of the power generator and the combustion chamber.

The system may further include a storage battery for storing the power generated by the fuel cell.

According to the fourth aspect of the invention, the combustion product discharged from the gas combustor is used, thereby sufficiently enhancing the fuel utilization efficiency. As a result, the efficiency of generating power can be increased. Moreover, the gas-supply passage and the gas-exhaust passage can be simplified by using a single-chamber solid oxide fuel cell as the fuel cell of the power generator.

In addition, the power generator is located in the combustion chamber and is directly heated by the heat of combustion produced in the combustion chamber, so as to enhance the efficiency of heating the power generator.

A reformer may further be provided to increase the hydrogen concentration in the combustion product supplied to the fuel cell of the power generator, thereby improving the efficiency of power generation.

Moreover, part of the inflammable fuel is directly supplied to the power generator by bypassing the gas combustor, so that more power can be generated than when only the combustion product discharged from the gas combustor is supplied to generate power.

Furthermore, the gas mixture discharged from the power generator is supplied to and circulated in the gas combustor for combustion, thereby further improving the fuel utilization efficiency.

BEST MODE FOR CARRYING OUT THE INVENTION

Embodiments of the cogeneration system using a fuel cell according to the invention will hereinafter be described with reference to the drawings.

First Embodiment

Figure 1:
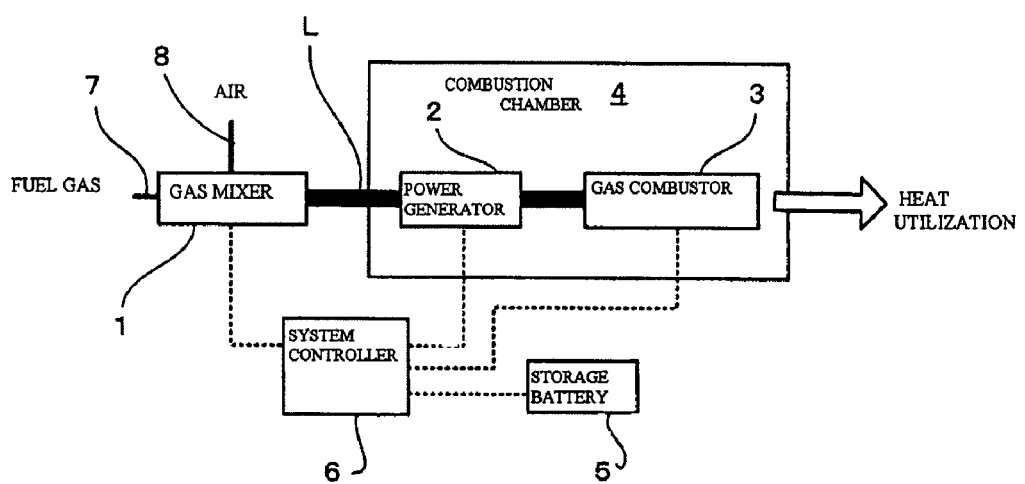
FIG. 1 is a block diagram showing a cogeneration system according to the first embodiment of the invention.

FIG. 1 is a block diagram showing a cogeneration system using a fuel cell according to the first embodiment.

The cogeneration system according to the first embodiment includes a gas mixer 1 for mixing a fuel gas (for example, propane or town gas) and an oxidant gas (for example, air), and a gas combustor (burner) 3 which is supplied with the gas mixture from the gas mixer 1. The gas combustor 3 is disposed in the combustion chamber 4. A power generator 2 having a fuel cell is disposed on a gas-mixture-supply passage L extending from the gas mixer 1 to the gas combustor 3. The power generator 2 is also disposed in the combustion chamber 4. This allows the power generator 2 to be directly heated by the heat of combustion produced in the combustion chamber 4 to ensure a sufficient operating temperature of the power generator 2. The system further includes a system controller 6 and a storage battery 5 for storing power generated by the fuel cell. The system controller 6 controls, for example, the amount of gas mixture supplied to the gas combustor 3.

In this system, a fuel gas and air are first supplied via a fuel-gas-supply passage 7 and an oxidant gas-supply passage 8, respectively, into the gas mixer 1 to form a gas mixture.

As described earlier, the power generator 2 is disposed on the gas-mixture-supply passage L, so as to generate power using the gas mixture flowing through the supply passage L. More specifically, the power generator 2 contains a single-chamber solid oxide fuel cell. This fuel cell has an electrolyte, a fuel electrode and an air electrode, and the fuel and air electrodes are not in separate chambers, i.e., the fuel cell is a single chamber type. When the gas mixture of the fuel gas and air is supplied to the fuel cell, a voltage is produced between the fuel and air electrodes because each electrode has gas selectivity. There are two types of configurations for the single-chamber solid oxide fuel cell: one in which a fuel electrode is disposed on one surface of an electrolyte, and an air electrode is disposed on the other surface, with the electrolyte interposing therebetween; and the other in which a pair of fuel and air electrodes are disposed on one surface of an electrolyte at a given distance from the electrolyte. The operating temperature is normally maintained in the range of about 400 to about 1,000° C., although it also depends upon the material of the fuel cell.

In this way, the power generator 2 uses part of the gas mixture, and the gas used for generating power is returned to the gas-mixture-supply passage L. The used gas is then supplied, together with the gas mixture from the gas mixer 1, into the gas combustor 3, where the resulting gas mixture is combusted as a fuel. The gas mixture is supplied to the gas combustor 3 where combustion takes place, and the power generator 2 is directly heated by the heat of combustion produced in the combustion chamber 4 to ensure a sufficient operating temperature of the power generator 2. Alternatively, all of the gas mixture may pass through the power generator 2.

The system controller 6 operates by the power generated by the power generator 2, and controls the power generator 2, gas mixer 1 and gas combustor 3. More specifically, the system controller 6 regulates the flow rate and pressure of each of the fuel gas and oxidant gas, according to the desired value of output to the power generator 1. The controller 6 also constantly measures the gas-mixture ratio in the gas mixer 1 and adjusts the ratio to the set value. Moreover, the controller 6 measures and controls the temperatures of the combustion chamber 4 and the power generator 2. In addition, the controller 6 is connected to the storage battery 5, and charges the storage battery 5 by supplying excess power thereto. During system startup, the power stored in the storage battery 5 can be used to activate the system controller 6, and also to operate a startup heater, not shown in the figure, for heating the power generator. Moreover, in this system, part of the gas mixture flowing through the gas-supply passage L is consumed by the power generator 2. That is to say, the gas mixture consumed by and discharged from the power generator 2 is supplied to the gas combustor 3. Accordingly, gas combustion in the gas combustor 3 can be maintained under optimum conditions by controlling the supply of the gas mixture from the gas mixer 1 based on the amount of gas mixture consumed by the power generator 2. This control can be executed by the system controller 6.

Figure 2:
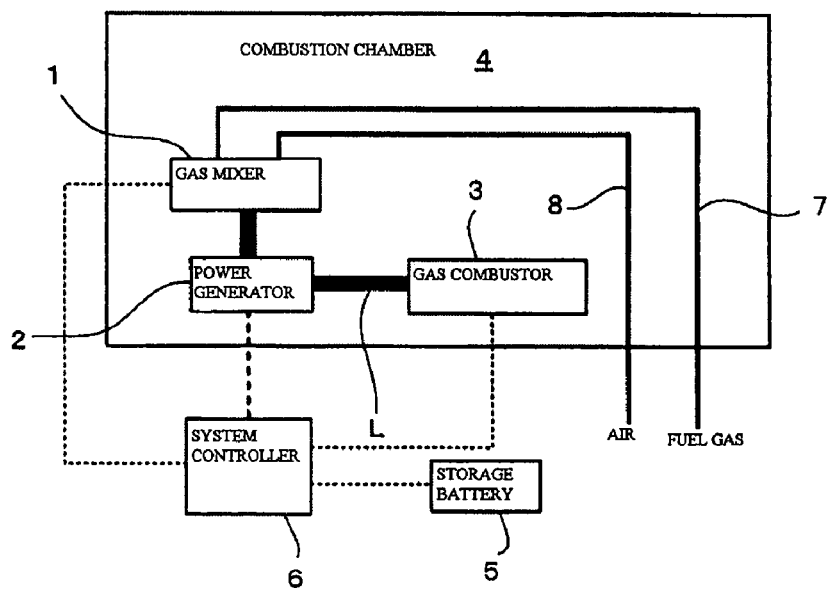
FIG. 2 is a block diagram showing another example of the system of FIG. 1.

FIG. 2 shows a modification of the system shown in FIG. 1. In this example, the gas mixer 1 is disposed in the combustion chamber 4 for preheating a gas mixture. This minimizes any reduction in the temperature of the power generator 2 caused by the gas supply, thereby further enhancing the fuel utilization efficiency.

Moreover, in this example, the fuel-gas-supply passage 7 and the air-supply passage 8 pass through the combustion chamber 4, so as to further increase the effect of preheating the gas mixture.

The configuration is otherwise the same as that shown in FIG. 1, and so the explanation is omitted, with the same numerals as used in FIG. 1 designating the same elements.

Figure 3:
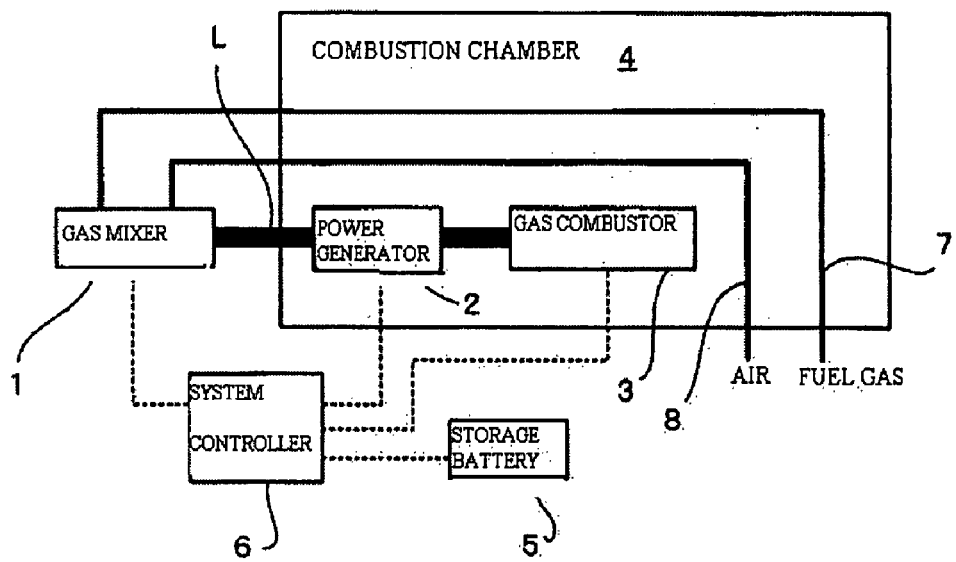
FIG. 3 is a block diagram showing still another example of the system of FIG. 1.

FIG. 3 shows another modification of the system shown in FIG. 1. As shown in FIG. 3, the system has, in addition to the configuration shown in FIG. 1, a feature in that the fuel-gas-supply passage 7 and the air-supply passage 8 pass through the combustion chamber 4. The supply passages 7, 8 are thus heated by the heat of combustion produced in the combustion chamber 4, so that preheated fuel gas and air are fed to the gas mixer 1 where they are mixed, and then the resulting gas mixture is supplied to the power generator 2. This also minimizes any reduction in the temperature of the power generator 2 caused by the gas supply, thereby saving the power for heating the power generator 2.

Figure 4:
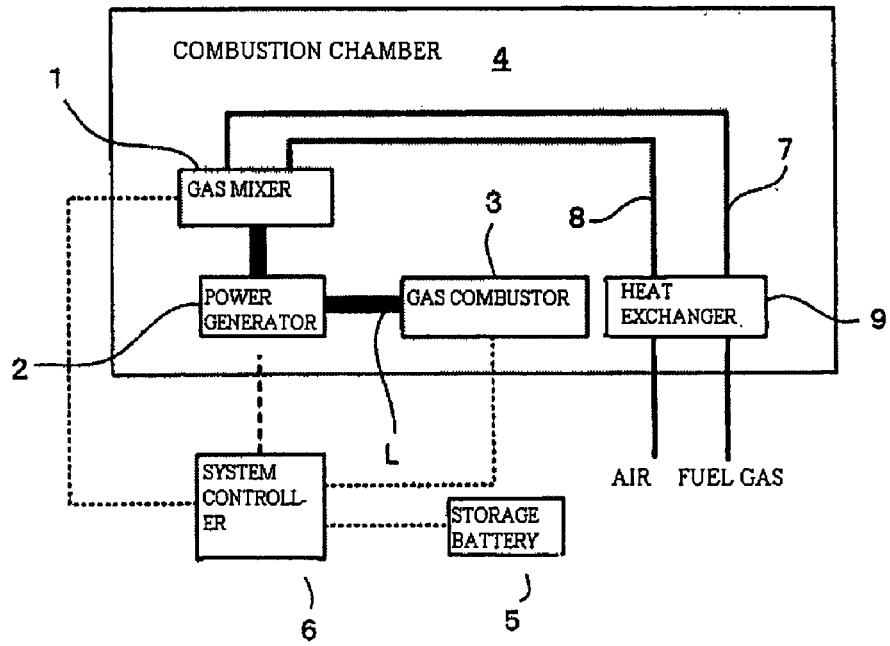
FIG. 4 is a block diagram showing yet another example of the system of FIG. 1.

FIG. 4 is a modification of the system shown in FIG. 2. As shown in FIG. 4, the system has, in addition to the configuration shown in FIG. 2, a feature in that the supply passages 7, 8 pass through a heat exchanger 9 located in the combustion chamber 4. Through the heat exchanger 9, the supply passages 7, 8 are heated by the heat of combustion produced in the combustion chamber 4. Hence, in this example, the use of the heat exchanger 9 saves the power for heating the power generator 2.

The systems described above in this embodiment are incorporated into a gas-powered apparatus such as a gas-powered fan heater, and the gas combustor and the combustion chamber of the gas-powered apparatus are used as a gas combustor 3 and a combustion chamber 4, respectively, in accordance with the system of the embodiment. The system shown in FIG. 3 is incorporated into a gas-powered apparatus equipped with a heat exchanger (such as a water-boiler), and the heat exchanger of the apparatus is used as a heat exchanger in accordance with the system of the embodiment.

As described above, according to this embodiment, the mixture of a fuel gas and an oxidant gas is supplied via the gas-mixture-supply passage L to the gas combustor 3, where the gas is combusted. Moreover, the power generator 2 containing a fuel cell is disposed midway along the gas-mixture-supply passage L, and generates power using the gas mixture supplied to the gas combustor 3. This allows power generation simultaneous with the generation of heat from the gas combustor 3, thus resulting in efficient use of energy. In addition, according to this embodiment, the power generator 2 is located in the combustion chamber 4, and directly heated by the heat of combustion produced in the combustion chamber 4. Hence, the power generator 2 can be directly heated by the heat of combustion in the combustion chamber 4, so as to enhance the efficiency of heating the power generator 2. Furthermore, this system can be accomplished by incorporating the power generator 2 into a general gas-powered apparatus. That is to say, because the power generator 2 is disposed on the gas-supply passage, a conventional gas-powered apparatus can be used without any modification to its combustion mechanism. Consequently, low-cost construction of a cogeneration system is possible.

Figure 5:
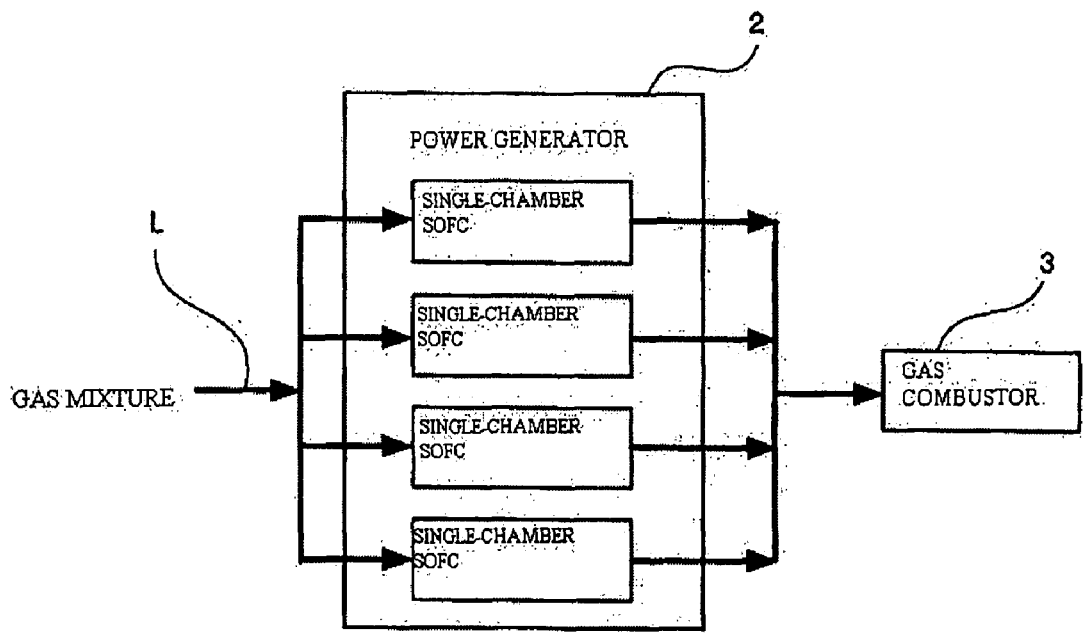
FIG. 5 is a block diagram showing an example of the power generator for use in the cogeneration system according to the first embodiment.

In each of the aforementioned systems according to this embodiment, the power generator 2 may include a single or a plurality of fuel cells. When a plurality of fuel cells are used, as shown in FIG. 5, the power generator 2 can be configured so that the gas flowing through the gas-mixture-supply passage L is supplied to each of the fuel cells (single-chamber SOFCs). In this case, the current output value can be adjusted by connecting the plurality of fuel cells in parallel. Alternatively, a plurality of fuel cells may be connected in series.

Second Embodiment

Figure 6:
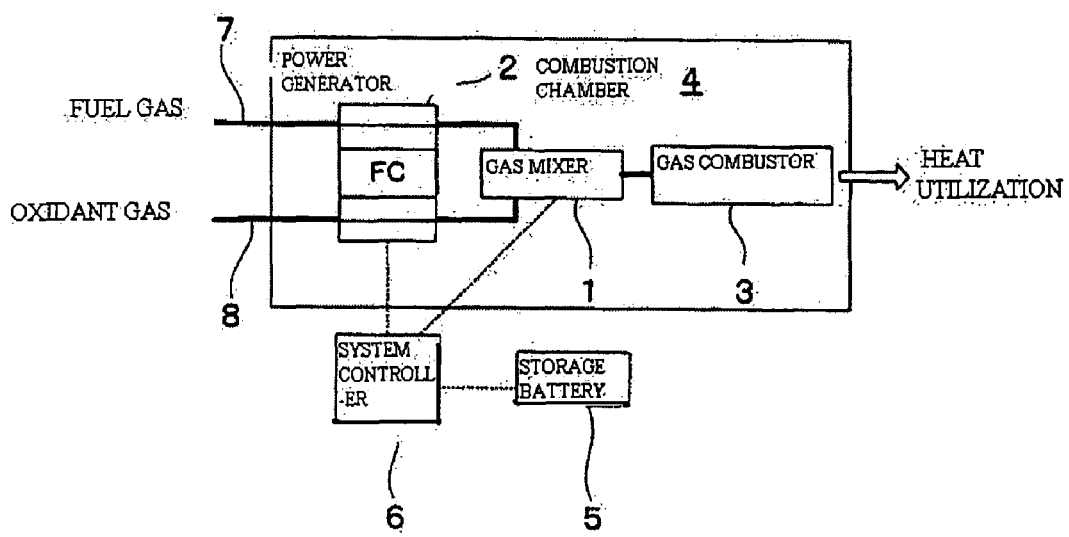
FIG. 6 is a block diagram showing a cogeneration system according to the second embodiment of the invention.

FIG. 6 is a block diagram showing a cogeneration system using a fuel cell according to the second embodiment.

As shown in FIG. 6, the cogeneration system according to the embodiment includes a fuel-gas-supply passage 7 and an oxidant gas-supply passage 8 for supplying a fuel gas (such as town gas or propane) and an oxidant gas such as air, respectively, to a gas mixer 1. These two gases are mixed by the gas mixer 1, and the gas mixture is then supplied to a gas combustor (burner) 3 for combustion. The supply passages 7, 8 constitute a gas-supply passage in accordance with the invention, and a power generator 2 with a solid oxide fuel cell is disposed midway along this gas-supply passage. The fuel cell has an electrolyte, a fuel electrode and an air electrode. The fuel electrode is formed on one surface of the electrolyte, and the air electrode is formed on the other surface of the electrolyte. The cell has two chambers, the fuel-electrode side and the air-electrode side, with the electrolyte disposed as a partition therebetween, to constitute a so-called two-chamber solid oxide fuel cell. Power is generated when a fuel gas is supplied to the fuel-electrode side from the fuel-gas-supply passage 7 and an oxidant gas is supplied to the air-electrode side from the oxidant gas-supply passage 8.

The gas mixer 1, gas combustor 3 and power generator 2 are located in a combustion chamber 4, so that the power generator 2 is directly heated by the heat of combustion produced in the combustion chamber 4, i.e., the heat from the gas combustor 3, to ensure the sufficient operating temperature of the power generator 2. The operating temperature is normally maintained in the range of about 400 to about 1,000° C., although it also depends upon the material of the fuel cell. Provided outside the combustion chamber 4 are a system controller 6 and a storage battery 5 for storing the power generated by the fuel cell.

The system controller 6 is activated by the power generated by the power generator 2, and controls the power generator 2, gas mixer 1 and gas combustor 3. More specifically, the system controller 6 regulates the flow rate and pressure of each of the fuel gas and oxidant gas, according to the desired value of output to the power generator 1. The controller 6 also constantly measures the gas-mixture ratio in the gas mixer 1 and adjusts the ratio to the set value. Moreover, the system controller 6 measures and controls the temperatures of the combustion chamber 4 and the power generator 2. In addition, the controller 6 is connected to the storage battery 5, and charges the storage battery 5 by supplying excess power thereto. During system startup, the power stored in the storage battery 5 can be used to activate the system controller 6, and also to operate a startup heater, not shown in the figure, for heating the power generator.

The system further comprises a detector, not shown, for detecting the gas-mixture ratio, and a gas-mixture-ratio adjuster for adjusting the mixture ratio to the set value based on a detection signal from the detector. The gas-mixture-ratio adjuster consists of regulating valve provided with the gas supply passages 7, 8 between the power generator 2 and the gas mixer 1 to regulate the supply of the gases to the gas mixer 1. The gas-mixture-ratio adjuster is controlled by the system controller 6. Alternatively, instead of, or in addition to the use of such a regulating valve, a supply passage (illustration omitted) for supplying a new fuel gas and/or a supply passage (illustration omitted) for supplying a new oxidizing agent which bypass the power generator 2 may be provided for supplying a new fuel gas and/or oxidizing agent to the gas mixer 1, thereby regulating the gas supply.

During system startup, the power stored in the storage battery 5 can also be used to operate a startup heater, not shown, to heat the power generator.

Moreover, in this system, part of the fuel gas and oxidant gas supplied to the gas mixer 1 is consumed by the power generator 2. That is to say, the fuel and oxidant gases consumed by and discharged from the power generator 2 are supplied to the gas mixer 1. Accordingly, gas combustion in the gas combustor 3 can be adjusted to a desired condition by controlling the amounts of the gases supplied to the gas mixer 1, i.e., the supply of the gases to the supply passages 7, 8, based on the amounts of the gases consumed by the power generator 2. This control can be executed by the system controller 6.

Figure 7:
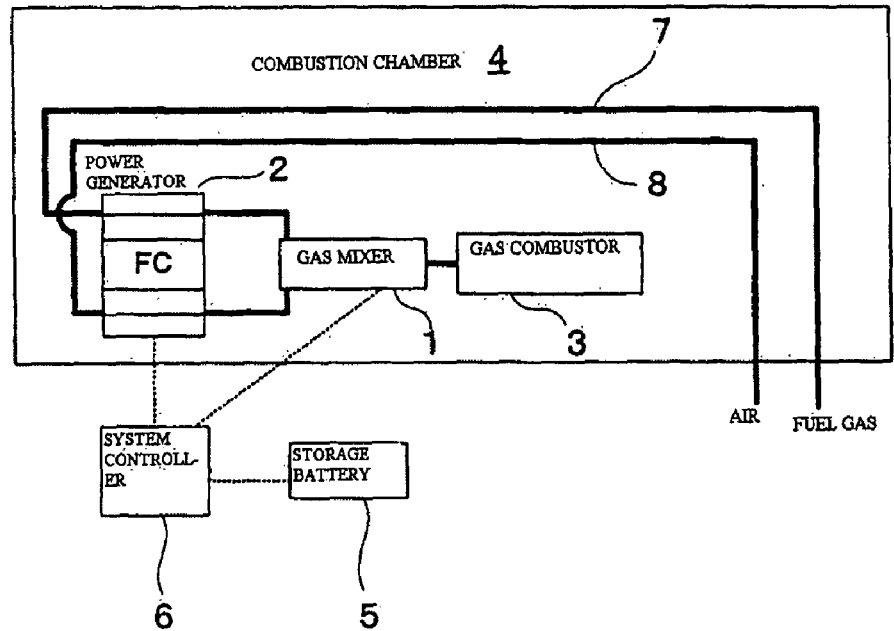
FIG. 7 is a block diagram showing another example of the system of FIG. 6.

FIG. 7 is a block diagram showing another example of the cogeneration system using a fuel cell according to the second embodiment.

This system is different from the system shown in FIG. 6 in that the fuel-gas-supply passage 7 and the air-supply passage 8 are located in the combustion chamber 4. Moreover, the lengths of the supply passages 7, 8 in the combustion chamber 4 are set so that the gases are preheated to high temperatures while flowing through the supply passages 7, 8, and supplied to the power generator 2. This minimizes any reduction in the temperature of the power generator 2 caused by the gas supply, thereby enhancing the fuel utilization efficiency.

The configuration is otherwise the same as that shown in FIG. 6, and so the explanation is omitted, with the same numerals as used in FIG. 6 designating the same elements.

Figure 8:
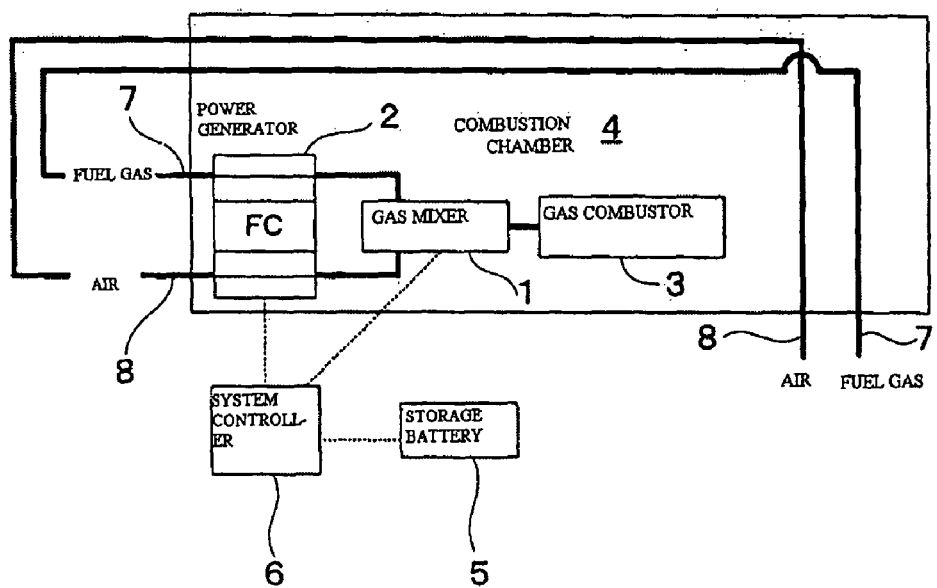
FIG. 8 is a block diagram showing still another example of the system of FIG. 6.

FIG. 8 is a block diagram showing still another example of the cogeneration system using a fuel cell according to the second embodiment. This example has, in addition to the configuration shown in FIG. 6, a feature in that the fuel-gas-supply passage 7 and the oxidant gas-supply passage 8 pass through the combustion chamber 4. More specifically, the gas supply passages 7, 8 which have passed through the combustion chamber 4 exit from the combustion chamber 4 once, and then return to the combustion chamber 4. The supply passages 7, 8 are then heated by the heat of combustion produced in the combustion chamber 4, so as to supply preheated fuel gas and air to the power generator 2. This also minimizes any reduction in the temperature of the power generator 2 caused by the gas supply, thereby saving the power for heating the power generator 2.

Figure 9:
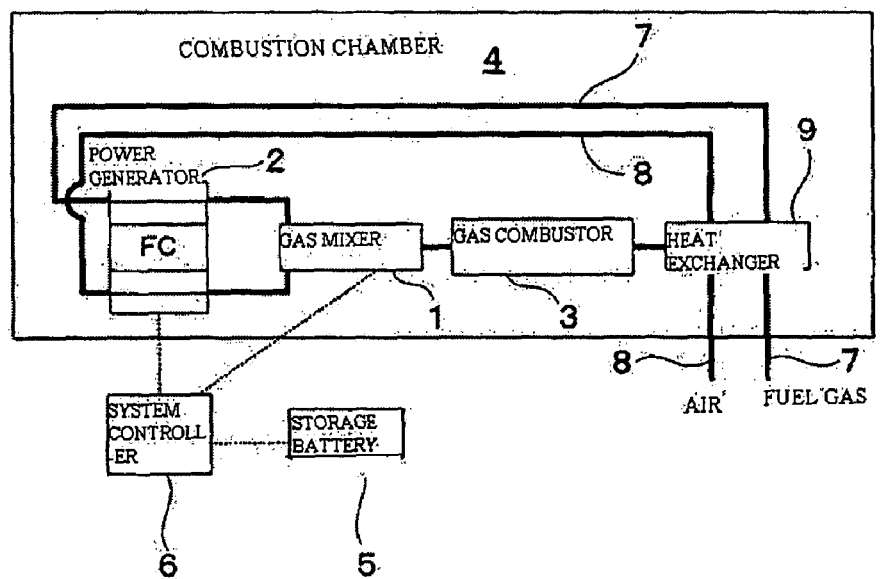
FIG. 9 is a block diagram showing yet another example of the system of FIG. 6.

FIG. 9 is a block diagram showing yet another example of the cogeneration system using a fuel cell according to the second embodiment. In this example, the gas combustor 3 is connected to a heat exchanger 9, so that the supply passages 7, 8 are heated by the heat of combustion produced from the gas combustor 3 via the heat exchanger 9. Moreover, as in FIG. 7, the supply passages 7, 8 pass through the combustion chamber 4, and the lengths of the supply passages 7, 8 in the combustion chamber 4 are set so that the gases are preheated to high temperatures while flowing through the supply passages 7, 8, and supplied to the power generator 2. This minimizes any reduction in the temperature of the power generator 2 caused by the gas supply, thereby enhancing the fuel utilization efficiency.

The systems previously described in this embodiment are incorporated into a gas-powered apparatus such as a gas-powered fan heater, and the gas combustor and the combustion chamber of the gas-powered apparatus are used as a gas combustor 3 and a combustion chamber 4, respectively, in accordance with the system of the embodiment. The system shown in FIG. 9 is incorporated into a gas-powered apparatus equipped with a heat exchanger (such as a water-boiler), and the heat exchanger of the apparatus is used as a heat exchanger in accordance with the system of the embodiment.

As described above, according to this embodiment, a fuel gas and an oxidant gas are supplied to the gas mixer 1 via the fuel-gas-supply passage 7 and the oxidant gas-supply passage 8, respectively. A gas mixture produced by the gas mixer 1 is then supplied to the combustor 3, where the gas is combusted. According to this embodiment, the power generator 2 containing a fuel cell is disposed midway along the supply passages 7, 8, and generates power using the fuel gas and oxidant gas supplied to the gas mixer 1. This allows power generation simultaneous with the generation of heat from the gas combustor, thus resulting in efficient use of energy. Note that the power generated can be used as a power source for operating this system, or for controlling the temperature of the heat discharged from the gas combustor 3.

Moreover, according to this embodiment, the power generator 2 is located in the combustion chamber 4 and is directly heated by the heat of combustion produced from the gas combustor 3. Hence, the power generator 2 is directly heated by the heat of combustion in the combustion chamber 4, thereby enhancing the efficiency of heating the power generator 2. Furthermore, this system can be constituted by incorporating the power generator 2 in a general gas-powered apparatus. That is to say, because the power generator 2 is disposed midway along the gas-supply passages 7, 8, a conventional gas-powered apparatus can be used without any modification to its combustion mechanism. Consequently, low-cost construction of a cogeneration system is possible.

Figure 10:
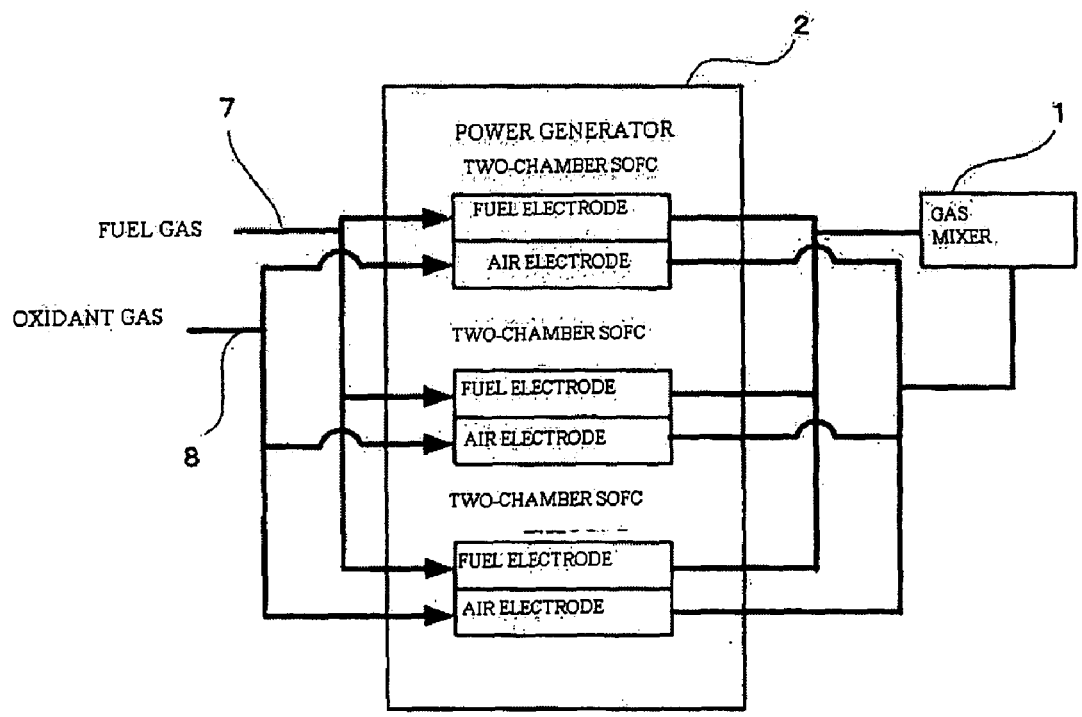
FIG. 10 is a block diagram showing an example of the power generator for use in the cogeneration system according to the second embodiment.

Moreover, although the power generator 2 includes a single fuel cell in this embodiment, it may also include a plurality of fuel cells. In the case of a plurality of fuel cells, as shown in FIG. 10, the power generator 2 can be configured so that the fuel gas flowing through the fuel-gas-supply passage 7 is supplied to the fuel electrode of each of the three fuel cells (two-chamber SOFCs), and the oxidant gas flowing through the oxidant gas-supply passage 8 is supplied to each of the air electrodes. The gases that have passed through the respective electrodes are supplied to the gas mixer 1 via the supply passage 7 or 8. In this case, the output current value can be adjusted by connecting the plurality of fuel cells in parallel. Alternatively, a plurality of fuel cells may be connected in series. The combustion chamber according to the first and second embodiments houses a power generator and a combustor such as a burner or the like, and may have a space in which the power generator can be heated by the heat of combustion generated from the combustor. For example, when the system is used in a gas-powered apparatus, the combustion chamber corresponds to a housing that includes supply passages for supplying necessary gases; a combustor such as a burner or the like; and an outlet for discharging hot air heated by the combustor. In this case, the housing may typically be composed of stainless steel.

Third Embodiment

Figure 11:
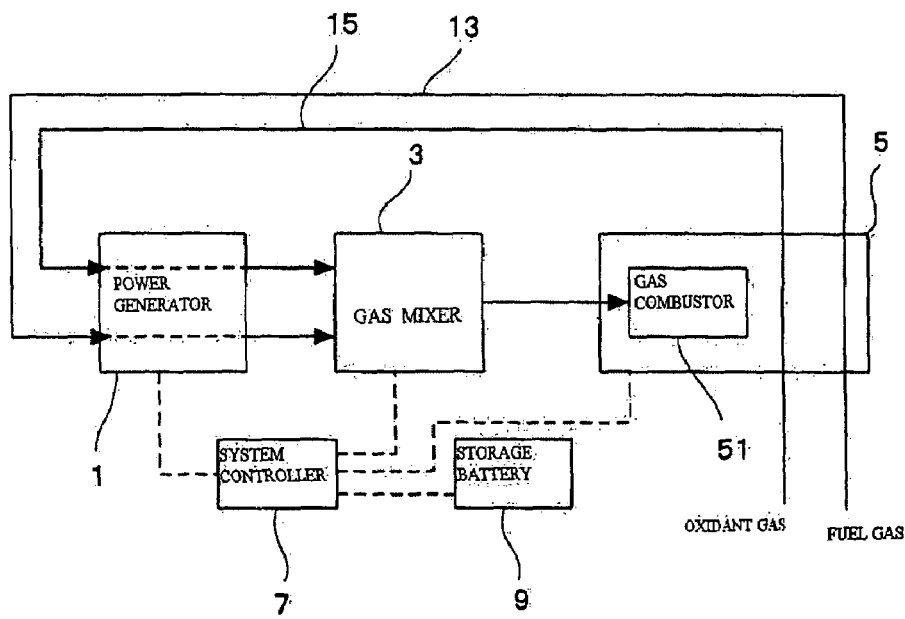
FIG. 11 is a block diagram showing a cogeneration system according to the third embodiment of the invention.

Referring to FIG. 11, a cogeneration system using a fuel cell according to the third embodiment of the invention will hereinafter be described. FIG. 11 is a block diagram showing a cogeneration system using a fuel cell according to the third embodiment.

As shown in FIG. 11, the cogeneration system includes a power generator 1, a gas mixer 3, a combustion chamber 5, a system controller 7 and a storage battery 9.

The power generator 1 is supplied with a fuel gas and an oxidant gas to generate power. More specifically, the power generator 1 contains a solid oxide fuel cell. This fuel cell has an electrolyte, a fuel electrode and an air electrode. The fuel electrode is formed on one surface of the electrolyte, and the air electrode is formed on the other surface of the electrolyte. The fuel cell is divided into two chambers, i.e., the fuel-electrode side and the air-electrode side, with the electrolyte disposed as a partition therebetween. The fuel cell generates power when a fuel gas is supplied to the fuel-electrode side and an oxidant gas is supplied to the air-electrode side. The operating temperature is normally maintained in the range of about 400 to about 1,000° C., although it also depends upon the material of the fuel cell.

The used fuel gas and oxidant gas are discharged as exhaust gases from the power generator 1, and supplied to the gas mixer 3. The exhaust gases are then mixed in the gas mixer 3 and discharged from the gas mixer 3 as a gas mixture.

The gas mixture discharged from the gas mixer 3 is supplied to the combustion chamber 5, where the gas mixture is burned as a fuel. More specifically, the combustion chamber 5 has a gas combustor (burner) 51, and the gas mixture from the gas mixer 3 is supplied to the combustion chamber 51 where the gas is combusted. In this configuration, a fuel-gas-supply passage 13 and an oxidant gas-supply passage 15 for supplying a fuel gas and an oxidant gas, respectively, to the system pass through the combustion chamber 5, so that part of the heat of combustion produced from the gas combustor 51 in the combustion chamber 5 preheats the fuel gas and oxidant gas. The preheated fuel gas and oxidant gas are then supplied to the power generator 1. The combustion chamber 5 and the gas combustor 51 in this embodiment are used as a combustion chamber and a gas combustor, respectively, of a gas-powered apparatus such as a gas-powered fan heater.

The system controller 7 in the embodiment operates on the power generated by the power generator 1, and controls the power generator 1, gas mixer 3 and combustion chamber 5. More specifically, the system controller 7 regulates the flow rate and pressure of each of the fuel gas and oxidant gas, according to the desired value of output to the power generator 1. The controller 7 also constantly measures the gas-mixture ratio in the gas mixer 3 and adjusts the ratio to the set value. Moreover, the controller 7 measures and controls the temperatures of the combustion chamber 5 and the power generator 1. In addition, the controller 7 is connected to the storage battery 9, and charges the storage battery 7 by supplying excess power thereto. During system startup, the power stored in the storage battery 9 can be used to activate the system controller 7, and also to heat the power generator 1.

The third embodiment is described using a solid oxide fuel cell that has a fuel electrode on one surface of an electrolyte, and an air electrode on the other surface of the electrolyte, and generates power when a fuel gas is supplied to the fuel electrode, and an oxidant gas is supplied to the air electrode; however, a known solid polymer fuel cell is also usable instead of such a solid oxide fuel cell.

As described above, according to the embodiment, the exhaust gases from the power generator 1 are used for combustion in the gas combustor 51, and the heat of combustion produced from the gas combustor 51 is used for preheating the fuel gas and oxidant gas. Consequently, the fuel utilization efficiency can be improved.

Figure 12:
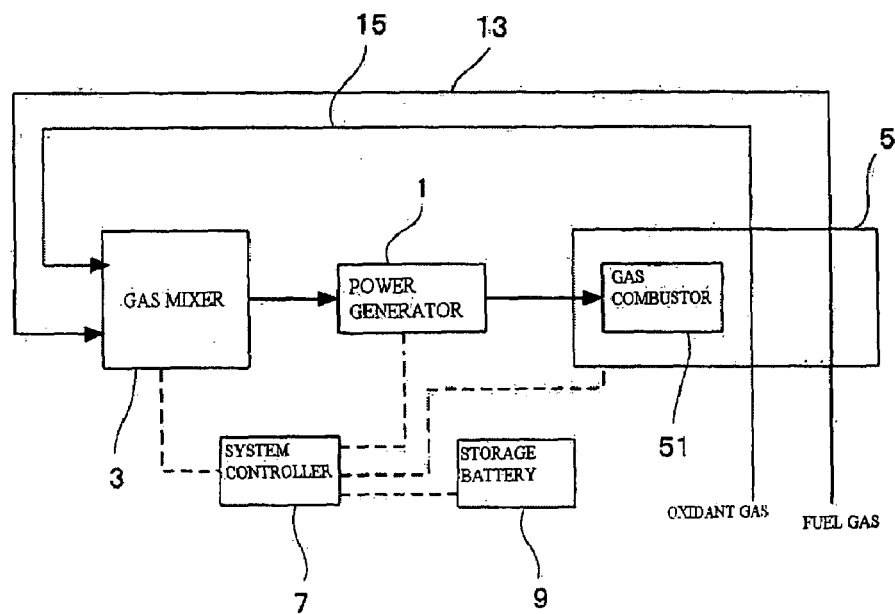
FIG. 12 is a block diagram showing another example of the system of FIG. 11.

Referring now to FIG. 12, another modification of the cogeneration system using a fuel cell according to this embodiment is described.

As with the system shown in FIG. 11, the system shown in FIG. 12 includes a power generator 1, a gas mixer 3, a combustion chamber 5, a system controller 7 and a storage battery 9.

In this system, a fuel gas and an oxidant gas are first supplied to the gas mixer 3 for forming a gas mixture. The gas mixture is supplied to the power generator 1 for power generation. More specifically, the power generator 1 contains a single-chamber solid oxide fuel cell having an electrolyte, a fuel electrode and an air electrode. Unlike the fuel cell used in the system shown in FIG. 11, this fuel cell is of the single-chamber type, in which the fuel-electrode side and the air-electrode side are not separated. When the mixture of the fuel gas and oxidant gas is supplied to the fuel cell, a voltage is produced between the fuel and air electrodes, because each electrode has gas selectivity, thus causing the cell to generate power. Therefore, unlike a two-chamber solid oxide fuel cell, the fuel cell does not require separate supplies of a fuel gas and an oxidant gas. This obviates a gas separator, thereby enabling a simple solid oxide fuel cell. There are two types of configurations for the single-chamber solid oxide fuel cell: one in which a fuel electrode is disposed on one surface of an electrolyte and an air electrode is disposed on the other surface of the electrolyte, with the electrolyte interposing therebetween; and the other in which a pair of fuel and air electrodes are disposed on one surface of an electrolyte at a given distance from the electrolyte.

The gas mixture discharged from the power generator 1 is then combusted by the gas combustor 51 in the combustion chamber 5, as in the system shown in FIG. 11. The fuel-gas-supply passage 13 and the oxidant gas-supply passage 15 which pass through the combustion chamber 5 are heated, and the preheated fuel gas and oxidant gas are supplied to the power generator 1.

The system controller 7 and the storage battery 9 function similarly to those in the system shown in FIG. 11.

This configuration further offers the following advantage, in addition to the advantages provided by the system of FIG. 11: the gas-supply line can be simplified by using, as the power generator 1, a single-chamber solid oxide fuel cell that generates power from the mixture of a fuel gas and an oxidant gas, thereby simplifying the system configuration.

In the systems shown in FIGS. 11 and 12, both the fuel gas and oxidant gas are preheated by the heat of combustion generated by the gas combustor 51; however, only one of these gases may be preheated. Alternatively, the heat generated from the gas combustor 51 may be transferred to the power generator 1.

Figure 13:
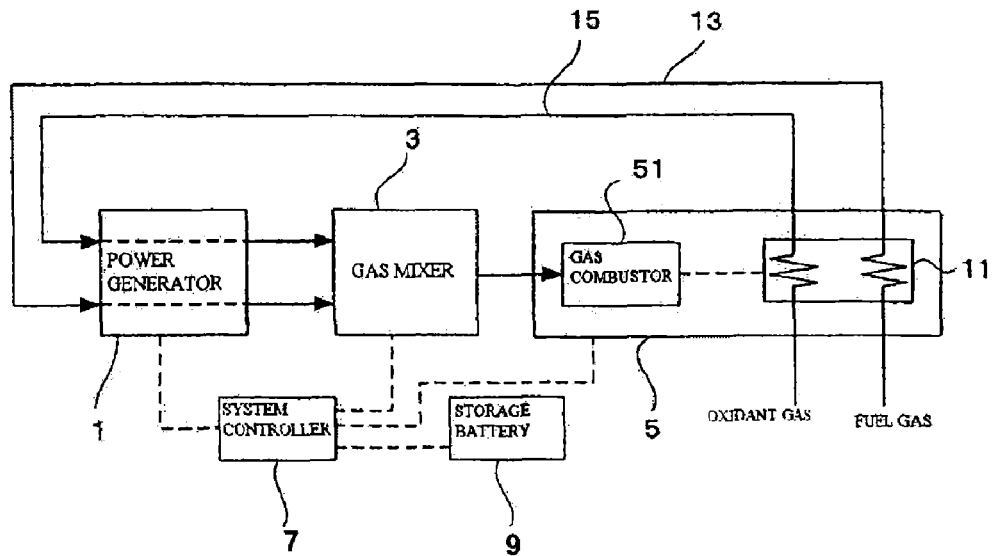
FIG. 13 is a block diagram showing still another example of the system of FIG. 11.

As another alternative, as shown in FIG. 13, the system may further include a heat exchanger 11, and the heat of combustion generated from the gas combustor 51 can be used via the heat exchanger 11 for external apparatuses such as a water-boiler and the like, while the fuel gas and oxidant gas are preheated.

Fourth Embodiment

Figure 14:
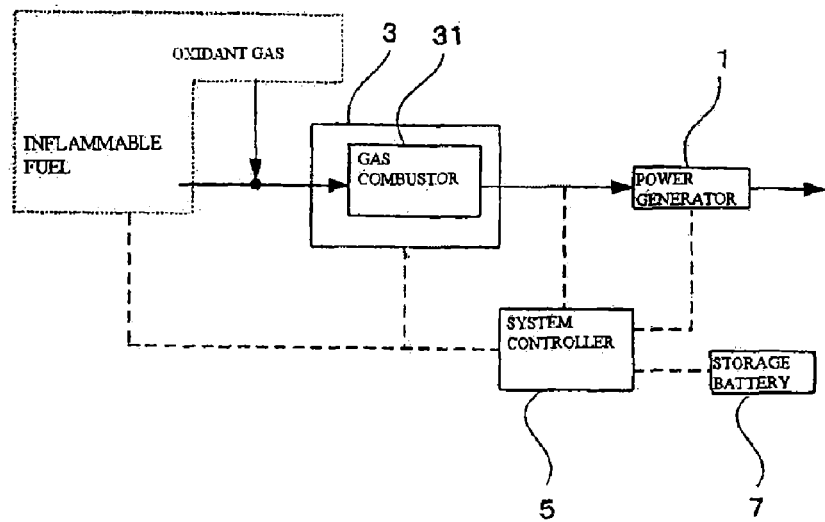
FIG. 14 is a block diagram showing a cogeneration system using a fuel cell according to the fourth embodiment of the invention.

Referring to the drawings, cogeneration systems using a fuel cell according to the fourth embodiment of the invention will hereinafter be described. FIG. 14 is a block diagram showing a cogeneration system using a fuel cell according to the fourth embodiment.

As shown in FIG. 14, the cogeneration system includes a power generator 1, a combustion chamber 3, a system controller 5 and a storage battery 7.

An inflammable fuel which is mixed with an oxidant gas, as necessary, is supplied to the combustion chamber 3, where combustion takes place. More specifically, the combustion chamber 3 has a gas combustor (burner) 31, and the inflammable fuel and the oxidant gas are supplied to the gas combustor 31 where they are combusted. The combustion product is then discharged from the gas combustor 31. Hydrocarbon gases and liquid fuels are usable as an inflammable fuel. Examples of hydrocarbon gases include methane, ethane, propane, butane, town gas, DME, lower alcohol gases with four or fewer carbon atoms, etc.; and examples of liquid fuels include kerosene, gasoline, etc. The term "combustion product" designates a product formed by the combustion of an inflammable fuel. The combustion product from the combustion chamber 3 contains carbon dioxide, steam, nitrogen oxide, carbon monoxide, an incombustible hydrocarbon, sulfur oxide and particles; whereas, as described below, the power generator 1 principally uses an incombustible hydrocarbon for power generation. The combustion product also contains oxygen.

The combustion product discharged from the gas combustor 31 in the combustion chamber 3 is supplied to the power generator 1 for power generation. More specifically, the power generator 1 includes a single-chamber solid oxide fuel cell. The fuel cell has an electrolyte, a fuel electrode and an air electrode, and the fuel and air electrodes are not in separate chambers, i.e., the fuel cell is a single chamber type. When the gas mixture of the combustion product and the oxidant gas is supplied to the fuel cell, a voltage is produced between the fuel and air electrodes because each electrode has gas selectivity, thus causing the cell to generate power. Therefore, unlike a general two-chamber solid oxide fuel cell, the fuel cell does not require separate supplies of a fuel gas and an oxidant gas. This obviates a gas separator, thereby enabling a simple solid oxide fuel cell. There are two types of configurations for the single-chamber solid oxide fuel cell: one in which a fuel electrode is disposed on one surface of an electrolyte, and an air electrode is disposed on the other surface of the electrolyte, with the electrolyte interposing therebetween; and the other in which a pair of fuel and air electrodes are disposed on one surface of an electrolyte at a given distance from the electrolyte.

The system controller 5 operates on the power generated by the power generator 1, and controls the power generator 1 and the combustion chamber 3. More specifically, the system controller 5 regulates the flow rate and pressure of the combustion product, according to the desired value of output to the power generator 1. Moreover, the system controller 5 measures and controls the temperatures of the combustion chamber 3 and the power generator 1. In addition, the system controller 5 is connected to the storage battery 7, and charges the storage battery 7 by supplying excess power thereto. During system startup, the power stored in the storage battery 5 can be used to activate the system controller 5, and also to heat the power generator 1.

The system controller 5 also detects the amount of combustion product discharged from the combustion chamber 31, and controls the supply of the fuel and oxidant gases to the combustion chamber 3 based on the detection result. Alternatively, the system controller 5 can detect the composition of the combustion product discharged, and determine an optimum supply of the fuel and oxidant gases based on the detection result. As another alternative, the combustion condition in the gas combustor 31 can be controlled based on both of these results.

As described above, in the fourth embodiment, the combustion product discharged from the gas combustor 31 is supplied to the power generator 1 for power generation. The fuel utilization efficiency can thus be improved. Moreover, the system controller 6 detects the amount, composition and/or the like of the combustion product discharged from the combustion chamber 3, and controls the supply of the oxidant gas and fuel to the combustion chamber 3 based on the detection result. It is therefore possible to constantly maintain an optimum amount of the combustion product necessary in the power generator 1.

Figure 15:
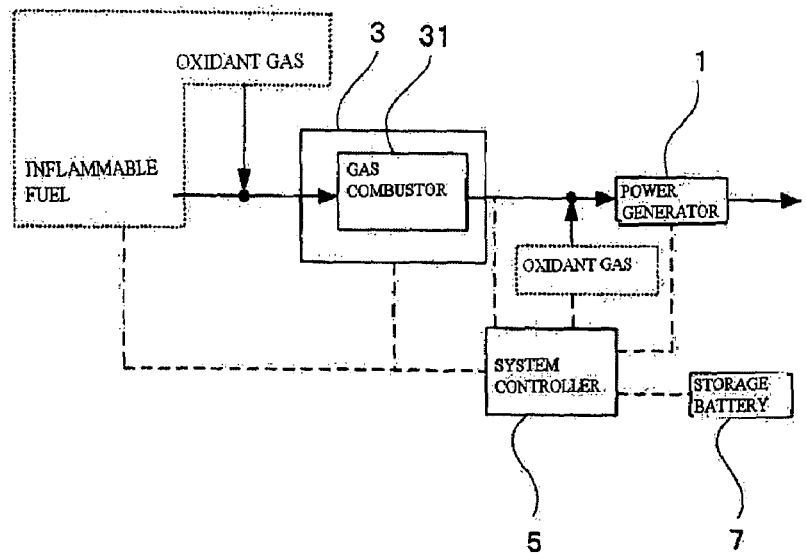
FIG. 15 is a block diagram showing another example of the system of FIG. 14.

Referring now to FIG. 15, the cogeneration system can also be configured so that an oxidant gas is supplied to the combustion product discharged from the combustor 3. This configuration can be adopted when, depending on the combustion condition in the gas combustor 31, the content of the oxidant gas in the discharged combustion product is low. Accordingly, this configuration makes it possible to supply a gas with an optimum composition for power generation to the power generator 1. In this case, the system controller 5 can detect the composition of the combustion product discharged from the gas combustor 31, and determine the supply of the oxidant gas based on the detection result. The system controller 5 can also control the supply of the oxidant gas to the combustion product, while adjusting the supply of the fuel and oxidant gas to the gas combustor 31. In this system, an oxidant gas-supply means, omitted in the figure, supplies an oxidant gas to the combustion product.

Figure 16:
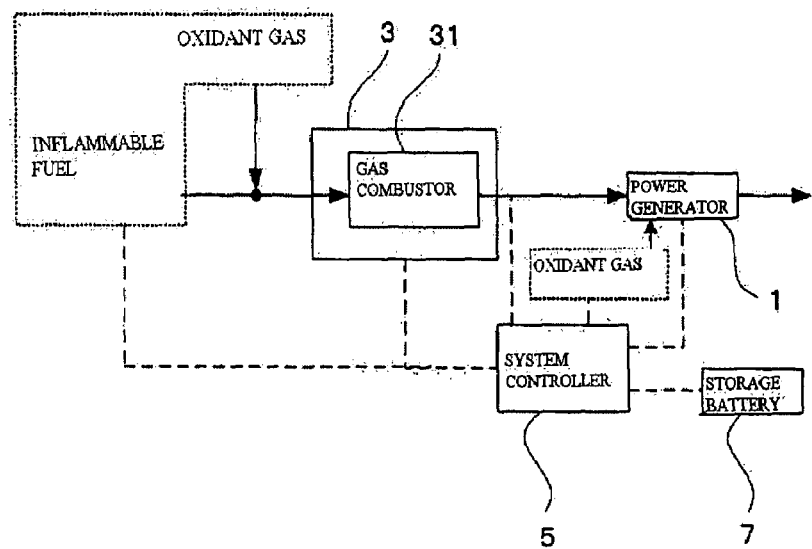
FIG. 16 is a block diagram showing still another example of the system of FIG. 14.

While the fourth embodiment is described using a single-chamber solid oxide fuel cell as the power generator 1, a two-chamber solid oxide fuel cell or a solid polymer fuel cell may be used instead of a single-chamber solid oxide fuel cell. When a two-chamber solid oxide fuel cell or a solid polymer fuel cell is used, as shown in FIG. 16, an oxidant gas is additionally supplied to the power generator 1, and power is generated using this oxidant gas and the combustion product discharged from the gas combustor 31. More specifically, the fuel cell of the power generator 1 has an electrolyte, a fuel electrode and an air electrode. There are two separate chambers in the fuel cell: one is the fuel-electrode side, and the other is the air-electrode side, with the electrolyte disposed as a partition therebetween. The fuel cell generates power when the combustion product discharged from the gas combustor 31 is supplied to the fuel-electrode side, and the oxidant gas is supplied to the air-electrode side. Where a known solid polymer fuel cell is used as the power generator 1, it is necessary for the system to further comprise a humidifier (illustration omitted) for humidifying the combustion product discharged from the gas combustor 31.

Figure 17:
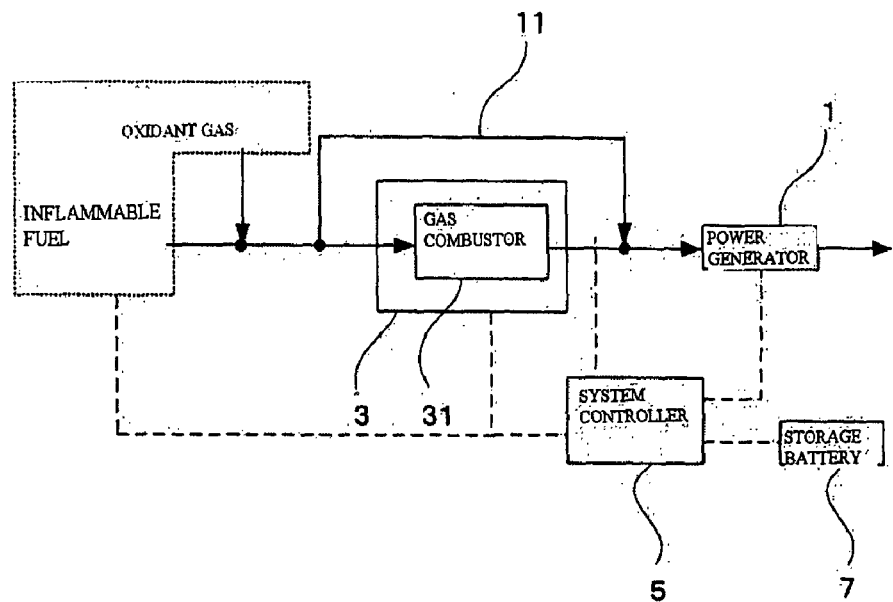
FIG. 17 is a block diagram showing yet another example of the system of FIG. 14.

Referring to FIG. 17, the system may further include a bypass line 11 for drawing part of the inflammable fuel and oxidant gas supplied to the gas combustor 31 and supplying it directly to the power generator 1. This allows the supply of not only the combustion product discharged from the gas combustor 31 but also additional supply of new inflammable fuel and oxidant gas to the power generator 1, thereby increasing the power generated by the power generator 1.

Figure 18:
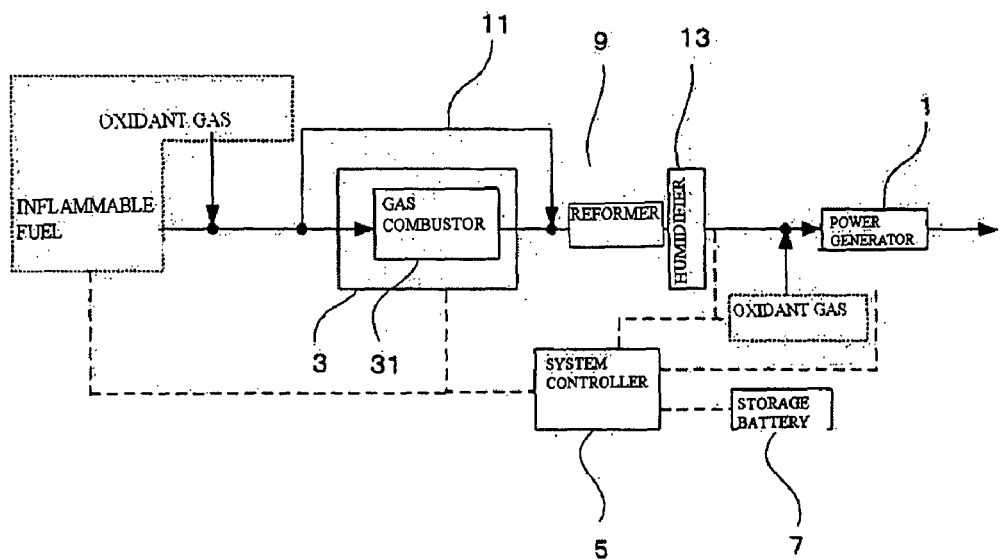
FIG. 18 is a block diagram showing still another example of the system of FIG. 14.

Referring to FIG. 18, the system may further include a reformer 9 for reforming the combustion product discharged from the gas combustor 31, and supply the reformed combustion product to the power generator 1. The system may also include a humidifier 13. The reformer 9 increases the hydrogen concentration in the combustion product supplied to the fuel cell of power generator 1, thereby improving the efficiency of generating power. Moreover, the reformer 9 can be equipped with a trap device or a filter capable of removing nitrogen oxide, carbon monoxide and sulfur oxide contained in the combustion product. In addition, when the fuel cell is a solid oxide fuel cell, the humidifier 13 serves to reduce carbon deposition caused by the cell reaction.

Figure 19:
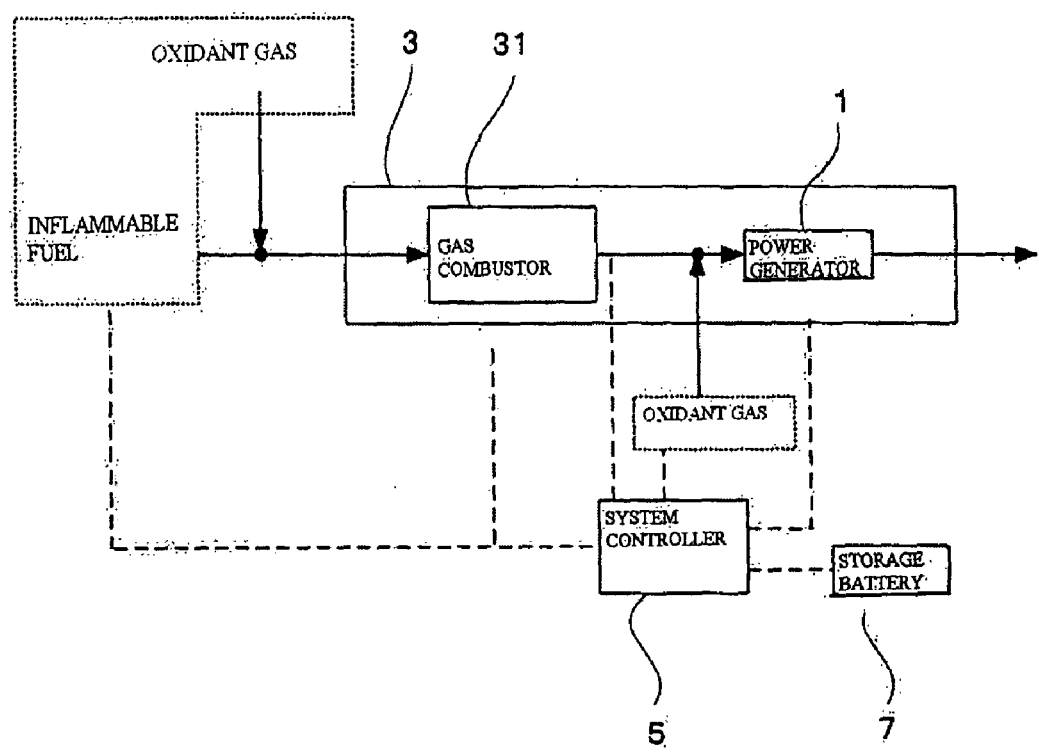
FIG. 19 is a block diagram showing yet another example of the system of FIG. 14.

Referring to FIG. 19, the system may also include a power generator 1 in the combustion chamber 3. This allows the power generator 1 to be directly heated by the heat of combustion produced from the gas combustor 31 in the combustion chamber 3. More specifically, the gas combustor 31 and the power generator 1 are located in the combustion chamber 3. An inflammable fuel and an oxidant gas are supplied to the gas combustor 31, where the inflammable gas and oxidant gas are burned as fuels. The oxidant gas and the combustion product discharged from the gas combustor 31 are then supplied to the power generator 1 which generates power from the combustion product and oxidant gas. With this configuration, the heat of combustion produced from the gas combustor 31 can be used as at least part of the heat necessary to operate the fuel cell of the power generator 1, thereby improving the heating efficiency. As described previously, the combustion chamber used herein may have a space in which a power generator can be heated by the heat from a combustor.

Moreover, the gas mixture discharged from the power generator 1 can be circularly supplied to the gas combustor 31, so as to further improve the fuel utilization efficiency.

While the combustion product discharged from the combustion chamber is mixed with an oxidant gas in the systems shown in FIGS. 18 and 19, the supply of an oxidant gas may not be necessary, depending on the composition of the combustion product.

The systems according to FIGS. 14 and 19 shown above can be constituted by attaching power generators with a fuel cell to existing apparatuses with a combustion chamber such as, for example, gas-powered apparatuses, cars, motorcycles and the like. That is to say, the systems only require that the combustion product discharged from the combustion chamber be supplied to the fuel cell. Accordingly, the addition of any large-scale configuration is unnecessary, so that a cogeneration system can be constructed at low cost.

INDUSTRIAL APPLICABILITY

The present invention provides a cogeneration system using a fuel cell which offers increased power-generating efficiency.

The invention claimed is:

1. A cogeneration system using a fuel cell, comprising:
a gas-mixture-supply passage supplied with a gas mixture of a fuel gas and an oxidant gas;
a power generator disposed on the gas-mixture-supply passage and having at least one fuel cell that generates power using the gas mixture flowing through the gas-mixture-supply passage;
a gas combustor for combusting the gas mixture which has passed through the power generator disposed on the gas-mixture-supply passage; and
a combustion chamber for housing the gas combustor;
wherein a portion of the gas-mixture-supply passage in which the power generator is disposed is located in the combustion chamber, and
heat of combustion is produced in the combustion chamber by the gas combustor, and the power generator is heated by the heat of combustion.

2. The cogeneration system using a fuel cell according to claim 1, wherein the power generator is heated by the heat of combustion produced in the combustion chamber to ensure sufficient operating temperature of the power generator.

3. The cogeneration system using a fuel cell according to claim 1, wherein the fuel cell is a single-chamber solid oxide fuel cell having an electrolyte, a fuel electrode and an air electrode, and generates power when supplied with the gas mixture of the fuel gas and oxidant gas.

4. The cogeneration system using a fuel cell according to claim 1, further comprising a gas mixer for mixing the fuel gas and oxidant gas.

5. The cogeneration system using a fuel cell according to claim 4, wherein the gas mixer is located in the combustion chamber to preheat the gas mixture.

6. The cogeneration system using a fuel cell according to claim 1, wherein at least one of a supply passage for supplying the fuel gas to the power generator and a supply passage for supplying the oxidant gas to the power generator is provided in the combustion chamber to preheat the gas.

7. The cogeneration system using a fuel cell according to claim 1, further comprising a heat exchanger located in the combustion chamber, wherein the fuel gas and oxidant gas are preheated by the heat of combustion produced in the combustion chamber via the heat exchanger, and supplied to the power generator.

8. The cogeneration system using a fuel cell according to claim 1, further comprising a storage battery for storing the power generated by the fuel cell.

9. The cogeneration system using a fuel cell according to claim 1, further comprising a system controller for controlling each of components of the system.

10. The cogeneration system using a fuel cell according to claim 9, wherein the system controller controls the supply of the gas mixture to the gas combustor so that an optimum combustion condition is maintained based on the amount of gas mixture consumed by the fuel cell.

11. The cogeneration system using a fuel cell according to claim 1, wherein the power generator has a plurality of fuel cells, and the gas mixture passing through the gas-mixture-supply passage is supplied to each of the fuel cells.

12. A cogeneration system using a fuel cell, comprising:
a gas-supply passage that separately supplies a fuel gas and an oxidant gas;
a power generator disposed on the gas-supply passage and having a fuel cell that generates power when separately supplied with the fuel gas and oxidant gas;
a gas mixer for mixing the fuel gas and oxidant gas which have passed through the power generator disposed on the gas-supply passage; and
a combustion chamber having a gas combustor for combusting the gas mixture mixed by the gas mixer;
wherein the power generator is located in the combustion chamber, so as to be heated by the heat of combustion produced in the combustion chamber.

13. The cogeneration system using a fuel cell according to claim 12, wherein the power generator is heated by the heat of combustion produced in the combustion chamber to ensure a sufficient operating temperature of the power generator.

14. The cogeneration system using a fuel cell according to claim 12, wherein the fuel cell has an electrolyte, a fuel electrode and an air electrode; the fuel electrode being formed on one surface of the electrolyte and the air electrode being formed on the other surface of the electrolyte; the fuel cell generating power when the fuel gas is supplied to the fuel electrode and the oxidant gas is supplied to the air electrode.

15. The cogeneration system using a fuel cell according to claim 14, wherein the fuel cell is a solid polymer fuel cell or a solid oxide fuel cell.

16. The cogeneration system using a fuel cell according to claim 12, further comprising:
   a detector for detecting a mixture ratio of the gas mixture; and
   a gas-mixture-ratio adjuster for adjusting the mixture ratio to a set value based on a detection signal from the detector.

17. The cogeneration system using a fuel cell according to claim 12, wherein the gas-supply passage comprises a fuel-gas-supply passage for supplying a fuel gas and an oxidant gas-supply passage for supplying an oxidant gas, wherein at least one of these supply passages is located in the combustion chamber to preheat the gas.

18. The cogeneration system using a fuel cell according to claim 12, further comprising a heat exchanger located in the combustion chamber, wherein the fuel gas and oxidant gas are preheated by the heat of combustion produced in the combustion chamber via the heat exchanger, and supplied to the power generator.

19. The cogeneration system using a fuel cell according to claim 12, further comprising a storage battery for storing the power generated by the fuel cell.

20. The cogeneration system using a fuel cell according to claim 12, further comprising a system controller for controlling each of components of the system.

21. The cogeneration system using a fuel cell according to claim 20, wherein the system controller controls the supply of the fuel gas and oxidant gas to the gas mixer so that a desired combustion condition is attained based on the amounts of these gases consumed by the fuel cell.

22. The cogeneration system using a fuel cell according to claim 12, wherein the power generator has a plurality of fuel cells, and the fuel gas and oxidant gas passing through the gas-supply passage are supplied to each of the fuel cells.

23. A cogeneration system using a fuel cell, comprising:
   a power generator having a fuel cell that generates power when supplied with a fuel gas and an oxidant gas; and
   a combustion chamber having a gas combustor for combusting exhaust gases from the power generator;
   wherein at least one of the fuel gas and oxidant gas is preheated by part of the heat of combustion produced from the gas combustor, and
   wherein at least either a fuel-gas-supply passage or an oxidant gas-supply passage for supplying the fuel gas or oxidant gas, respectively, to the power generator, passes through the combustion chamber, whereby at least either the fuel gas or the oxidant gas is preheated by part of the heat of combustion generated from the gas combustor.

24. The cogeneration system using a fuel cell according to claim 23, wherein the fuel cell is a solid oxide fuel cell or a solid polymer fuel cell having an electrolyte, a fuel electrode and an air electrode; the fuel electrode being formed on one surface of the electrolyte and the air electrode being formed on the other surface of the electrolyte; the fuel cell generating power when the fuel gas is supplied to the fuel electrode and the oxidant gas is supplied to the air electrode.

25. The cogeneration system using a fuel cell according to claim 23, wherein the fuel cell is a single-chamber solid oxide fuel cell having an electrolyte, a fuel electrode and an air electrode, and generates power when supplied with the gas mixture of the fuel gas and oxidant gas.

26. The cogeneration system using a fuel cell according to claim 24, further comprising a gas mixer for mixing the exhaust gases discharged from the power generator and supplied to the gas combustor.

27. The cogeneration system using a fuel cell according to claim 25, further comprising a gas mixer for mixing the fuel gas and oxidant gas supplied to the power generator.

28. The cogeneration system using a fuel cell according to claim 23, further comprising a system controller for controlling at least either the flow rates and pressures of the fuel gas and oxidant gas supplied to the power generator, or the temperatures of the power generator and the combustion chamber.

29. The cogeneration system using a fuel cell according to claim 26, further comprising a system controller for controlling a gas-mixture ratio in the gas mixer.

30. The cogeneration system using a fuel cell according to claim 23, further comprising a heat exchanger, wherein at least either the fuel gas or the oxidant gas is preheated by part of the heat of combustion generated from the gas combustor.

31. The cogeneration system using a fuel cell according to claim 23, further comprising a storage battery for storing the power generated by the fuel cell.

32. A cogeneration system using a fuel cell, comprising:
   a combustion chamber having a gas combustor in which combustion takes place when supplied with an inflammable fuel and an oxidant gas; and
   a power generator having a fuel cell that generates power when supplied with a combustion product containing a hydrocarbon gas discharged from the gas combustor by combustion.

33. A cogeneration system using a fuel cell according to claim 32, further comprising a system controller for detecting at least either the amount or composition of the combustion product discharged, and controlling the flow rates of the inflammable fuel and oxidant gas supplied to the gas combustor based on a detection result.

34. The cogeneration system using a fuel cell according to claim 32, further comprising an oxidizer-supply means for supplying an oxidant gas to the combustion product before the combustion product is supplied to the power generator.

35. The cogeneration system using a fuel cell according to claim 34, wherein the system controller detects at least either the amount or composition of the combustion product, and controls the supply of the oxidant gas from the oxidizer-supply means based on a detection result.

36. The cogeneration system using a fuel cell according to claim 32, wherein the fuel cell is a single-chamber solid oxide fuel cell having an electrolyte, a fuel electrode and an air electrode, and generates power when supplied with the gas mixture of the oxidant gas and the combustion product discharged from the gas combustor.

37. The cogeneration system using a fuel cell according to claim 32, wherein the fuel cell is a solid oxide fuel cell having an electrolyte, a fuel electrode and an air electrode; the fuel electrode being formed on one surface of the electrolyte and the air electrode being formed on the other surface of the electrolyte; the fuel cell generating power when the combustion product discharged from the gas combustor is supplied to the fuel electrode and the oxidant gas is supplied to the air electrode.

38. The cogeneration system using a fuel cell according to claim 32, wherein the fuel cell is a solid oxide fuel cell having an electrolyte, a fuel electrode and an air electrode; the fuel electrode being formed on one surface of the electrolyte and the air electrode being formed on the other surface of the electrolyte; the fuel cell generating power when the combustion product discharged from the gas combustor is supplied to the fuel electrode, and the oxidant gas is supplied to the air electrode;

the system further comprising a humidifier for humidifying the combustion product discharged from the gas combustor.

39. The cogeneration system using a fuel cell according to claim 32, further comprising a humidifier for humidifying the combustion product discharged from the gas combustor.

40. The cogeneration system using a fuel cell according to claim 32, wherein the power generator is located in the combustion chamber, so as to be heated by the heat of combustion produced in the combustion chamber.

41. The cogeneration system using a fuel cell according to claim 32, further comprising a reformer for reforming the combustion product discharged from the gas combustor.

42. The cogeneration system using a fuel cell according to claim 32, further comprising a bypass line for drawing part of the gas mixture of the inflammable fuel and the oxidant gas supplied to the gas combustor, and supplying the gas mixture directly to the power generator.

43. The cogeneration system using a fuel cell according to claim 32, wherein the gas mixture discharged from the power generator is circularly supplied to the gas combustor in circle.

44. The cogeneration system using a fuel cell according to claim 33, wherein the system controller controls the temperatures of the power generator and the combustion chamber.

45. The cogeneration system using a fuel cell according to claim 32, further comprising a storage battery for storing the power generated by the fuel cell.

* * * * *